(12) United States Patent
Hasegawa et al.

(10) Patent No.: US 7,693,396 B2
(45) Date of Patent: Apr. 6, 2010

(54) RECORDING/PLAYBACK APPARATUS AND RECORDING/PLAYBACK CONTROL METHOD

(75) Inventors: Taketo Hasegawa, Kanagawa (JP); Nobuharu Ichihashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 10/745,570

(22) Filed: Dec. 29, 2003

(65) Prior Publication Data

US 2004/0146280 A1 Jul. 29, 2004

(30) Foreign Application Priority Data

Jan. 23, 2003 (JP) ............... 2003-014852

(51) Int. Cl.
H04N 5/91 (2006.01)
H04N 7/00 (2006.01)
H04N 7/10 (2006.01)
H04N 7/173 (2006.01)
G06F 3/00 (2006.01)

(52) U.S. Cl. .................. 386/83; 386/46; 386/52; 386/69; 386/94; 386/95; 725/39; 725/44; 725/45; 725/88; 725/89

(58) Field of Classification Search .......... 386/1, 386/46, 95, 96, 110–112, 121, 124; 725/39, 725/44, 45, 88, 89
See application file for complete search history.

(56) References Cited

U.S. PATENT DOCUMENTS

| 5,367,571 | A  | * | 11/1994 | Bowen et al. ............... 380/242 |
| 6,965,975 | B2 | * | 11/2005 | Jeong ........................ 711/161 |
| 2002/0035727 | A1 | * | 3/2002 | Numata et al. ............... 725/44 |
| 2003/0005454 | A1 | * | 1/2003 | Rodriguez et al. ........... 725/89 |

FOREIGN PATENT DOCUMENTS

| EP | 1 014 715 | 6/2000 |
| JP | 2000-285576 | 10/2000 |
| WO | WO 00/01149 | 1/2000 |

* cited by examiner

*Primary Examiner*—Marsha D Banks Harold
*Assistant Examiner*—Michael Choi
(74) *Attorney, Agent, or Firm*—Fitzpatrick, Cella, Harper & Scinto

(57) ABSTRACT

A designated program is recorded in a hard disk by a hard disk controller according to a program reservation database. A unique number is indicated at the head block of a video cassette tape for identifying the tape, and a genre of programs is recorded in the subsequent block of the tape. When the video cassette tape is loaded, the information concerning the genre is read, and if there is record information of the same genre as that of the tape contained in the hard disk, it is additionally recorded in the video cassette tape.

6 Claims, 9 Drawing Sheets

FIG. 5

| | 310 NUMBER | 311 CHANNEL | 312 DATE | 313 START TIME | 314 END TIME | 315 PROGRAM NAME | 316 GENRE | 317 RECORD TIME | 318 RECORD MODE |
|---|---|---|---|---|---|---|---|---|---|
| 300 | 1 | 101 | 11/18 | 20:00 | 20:55 | FRIDAY DRAMA SPECIAL | DRAMA | 55 | SP |
| 301 | 2 | 104 | 11/19 | 18:00 | 18:30 | ADVENTURE XXX | ANIMATION | 30 | SP |
| 302 | 3 | 102 | 11/19 | 21:00 | 22:55 | SATURDAY MOVIE THEATER | MOVIE | 115 | LP |
| 303 | 4 | 103 | 11/21 | 01:00 | 03:55 | MID-NIGHT THEATER | MOVIE | 115 | LP |
| 304 | 5 | 101 | 11/22 | 19:00 | 19:58 | POPULAR MUSIC SHOW | MUSIC | 58 | SP |
| 305 | 6 | | | | | | | | |
| 306 | 7 | | | | | | | | |
| 307 | 8 | | | | | | | | |

FIG. 6

| TIME \ CHANNEL | 101 | 102 | 103 | 104 |
|---|---|---|---|---|
| 18 | NEWS | PROFESSIONAL BASEBALL GAME | NEWS | NEWS |
|    | WEATHER FORECAST | | | ANIMATION |
| 19 | FRIDAY DRAMA | | MOVIE | FOOTBALL |
| 20 | POPULAR MUSIC SHOW | | | |
| 21 | NEWS | | | DRAMA |

DO YOU WANT TO COPY SATURDAY MOVIE THEATER AND MID-NIGHT THEATER INTO VIDEO CASSETTE TAPE ?

IF "YES", PRESS "1", AND IF "NO", PRESS "2".

FIG. 8

SATURDAY MOVIE THEATER AND MID-NIGHT THEATER
HAVE BEEN COPIED INTO VIDEO CASSETTE TAPE.

DO YOU WANT TO ERASE THEM FROM HARD DISK ?

IF "YES", PRESS "1", AND IF "NO", PRESS "2".

FIG. 9

NEW VIDEO CASSETTE TAPE IS SET.
FOR WHICH PROGRAM GENRE DO YOU WANT TO USE
THIS TAPE ?

FOR DRAMA, PRESS "1".
FOR MOVIE, PRESS "2".
FOR ANIMATION, PRESS "3".
FOR SPORT, PRESS "4".

RECORDING/PLAYBACK APPARATUS AND RECORDING/PLAYBACK CONTROL METHOD

BACKGROUND OF THE INVENTION

1. Field of the Invention

The present invention relates to recording/playback apparatuses and recording/playback control methods, and more particularly, to a recording/playback apparatus and a recording/playback control method that are suitable for recording and playing back digital television broadcasts.

2. Description of the Related Art

A set-top box (STB) is used for receiving digital television broadcasts and for outputting the received digital audiovisual data as analog data. It has been proposed that an STB be equipped with a hard disk drive as a digital recording medium so as to record the received digital audiovisual data.

In digital television broadcasting, services are provided for transmitting information concerning broadcast programs in transport stream packets. The broadcast program information can be used for, for example, an electronic program guide (EPG).

Japanese Patent Laid-Open No. 2000-285576 discloses a broadcast-information recording apparatus for making reservations for recording programs by comparing EPG data with user's favorite data and for managing data to be recorded on exchangeable recording media such that a similar type of data is recorded in the same recording medium.

When the capacity of a hard disk, which is a solid storage medium, is running short, unnecessary data must be erased to ensure a space. In this case, if a detachable storage medium, for example, a digital video home system (VHS) or a digital versatile disk-RAM (DVD-RAM), is connected, together with a hard disk drive, to an STB, the stored information can be moved from the hard disk to the detachable storage medium if necessary. Then, the capacity of the hard disk can be ensured.

In a known recording apparatus, however, a complicated operation is required for rearranging programs stored in the hard disk according to the types of programs and for moving the rearranged programs to a plurality of detachable storage media.

SUMMARY OF THE INVENTION

Accordingly, it is an object of the present invention to provide a recording/playback apparatus and a recording/playback control method for automatically moving programs from a hard disk to detachable storage media based on program information, for example, the types of programs.

In order to achieve the above object, the present invention provides a recording/playback apparatus including a first recording medium and detachably attaching a second recording medium. The recording/playback apparatus includes: an input unit for inputting program data of a plurality of programs and identification information concerning the plurality of programs to be transmitted together with the program data; a recording/playback unit for recording or playing back the program data input by the input unit on or from the first recording medium; a retaining unit for retaining record program information in which the identification information concerning the plurality of programs recorded on the first recording medium are associated with the corresponding program data; a recorder for recording the program data on the second recording medium; a setting unit for setting identification information in the attached second recording medium; and a controller for controlling the recording/playback unit and the recorder to read the record program information from the retaining means, to select a program corresponding to the identification information set in the attached second recording medium from the plurality of programs, and to move the program data of the selected program from the first recording medium to the second recording medium.

According to the present invention, an identifier indicating the type of program to be stored in each detachable storage medium can be set so that the programs are rearranged and stored in the corresponding recording media according to the types of programs.

Further objects, features and advantages of the present invention will become apparent from the following description of the preferred embodiments with reference to the attached drawings.

BRIEF DESCRIPTION OF THE DRAWINGS

FIG. 5 illustrates a display example of reservation information.

FIG. 6 illustrates a display example of an EPG.

FIG. 7 illustrates a check message when copying programs from a hard disk into a video cassette tape.

FIG. 8 illustrates a check message when erasing programs stored in the hard disk.

FIG. 9 illustrates a selection message when initializing a new video cassette tape.

DESCRIPTION OF THE PREFERRED EMBODIMENTS

The present invention is described in detail below with reference to the accompanying drawings through illustration of preferred embodiments.

First Embodiment

Figure 1:
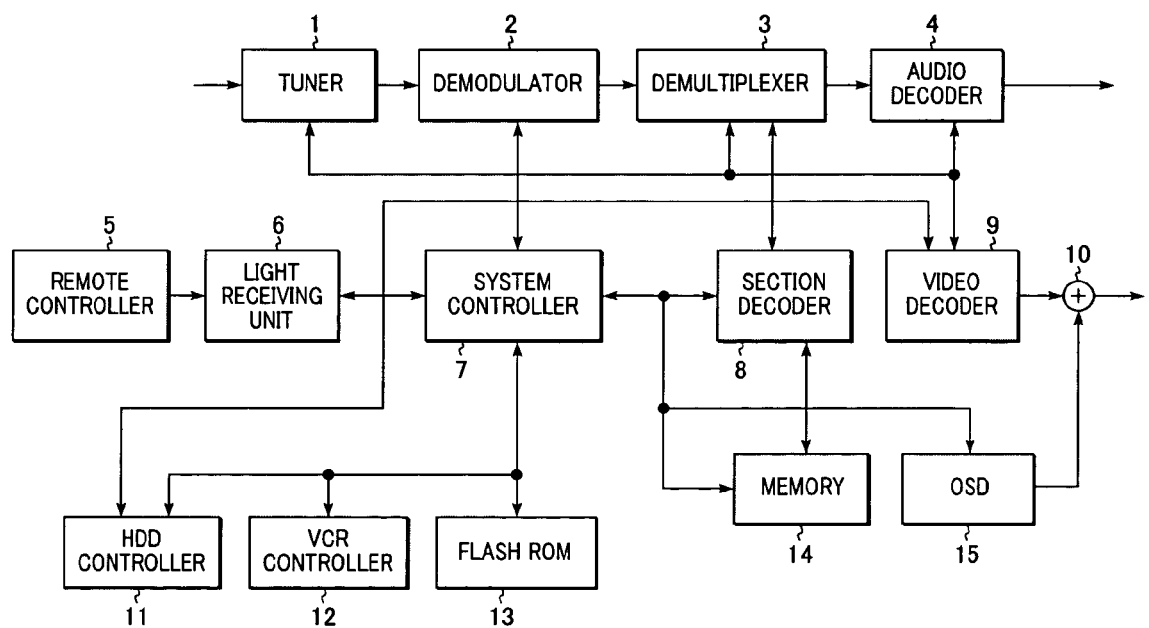
FIG. 1 is a schematic block diagram illustrating a recording/playback apparatus according to a first embodiment of the present invention.

FIG. 1 is a schematic block diagram illustrating a first embodiment of the present invention. When a user selects a desired program channel by using a remote controller 5, which serves as an instruction unit, the remote controller 5 transmits an infrared signal indicating the information concerning the channel number instructed by an infrared emitting unit (not shown) to a light receiving unit 6. The light receiving unit 6 analyzes the received infrared signal so as to determine which button (not shown) of the remote controller 5 is pressed, and reports the designated channel to a system controller 7. The system controller 7 reports setting information (receive frequency and packet identification (PID) information indicating a packet identifier for audio data and video data of a desired program contained in a multiplexed transport stream) for the designated channel to a tuner 1 and a demultiplexer 3. The tuner 1, a demodulator 2, and the demultiplexer 3, which form input means, perform signal processing on a digital television broadcast signal received by an antenna (not shown). The tuner 1 specifies a transponder that receives the digital television broadcast signal and selects the receive frequency band contained in the setting information according to the specified transponder. The digital television broadcast signal selected by the tuner 1 is supplied to the demodulator 2.

The demodulator 2 performs quadrature phase shift keying (QPSK) modulation on the received signal, and also demodulates Reed-Solomon codes so as to perform error correction, thereby reconstructing the digital television broadcast signal into transport packets. The reconstructed transport packets are supplied to the demultiplexer 3. The demultiplexer 3 separates the transport packets of the channel selected by the user from the reconstructed transport packets. The transport packet having section data containing the program information is supplied to a section decoder 8. The video and audio transport packets are descrambled and are supplied to a video decoder 9 and an audio decoder 4, respectively.

The video decoder 9 and the audio decoder 4 each convert the transport packets into an elementary stream (ES) so as to obtain compressed video data and compressed audio data, respectively. The compressed video data and the compressed audio data are decompressed and are output to output units, for example, a display monitor (not shown) and a speaker (not shown), respectively. Then, the user is able to view and listen to the received image and received sound.

Figure 3:
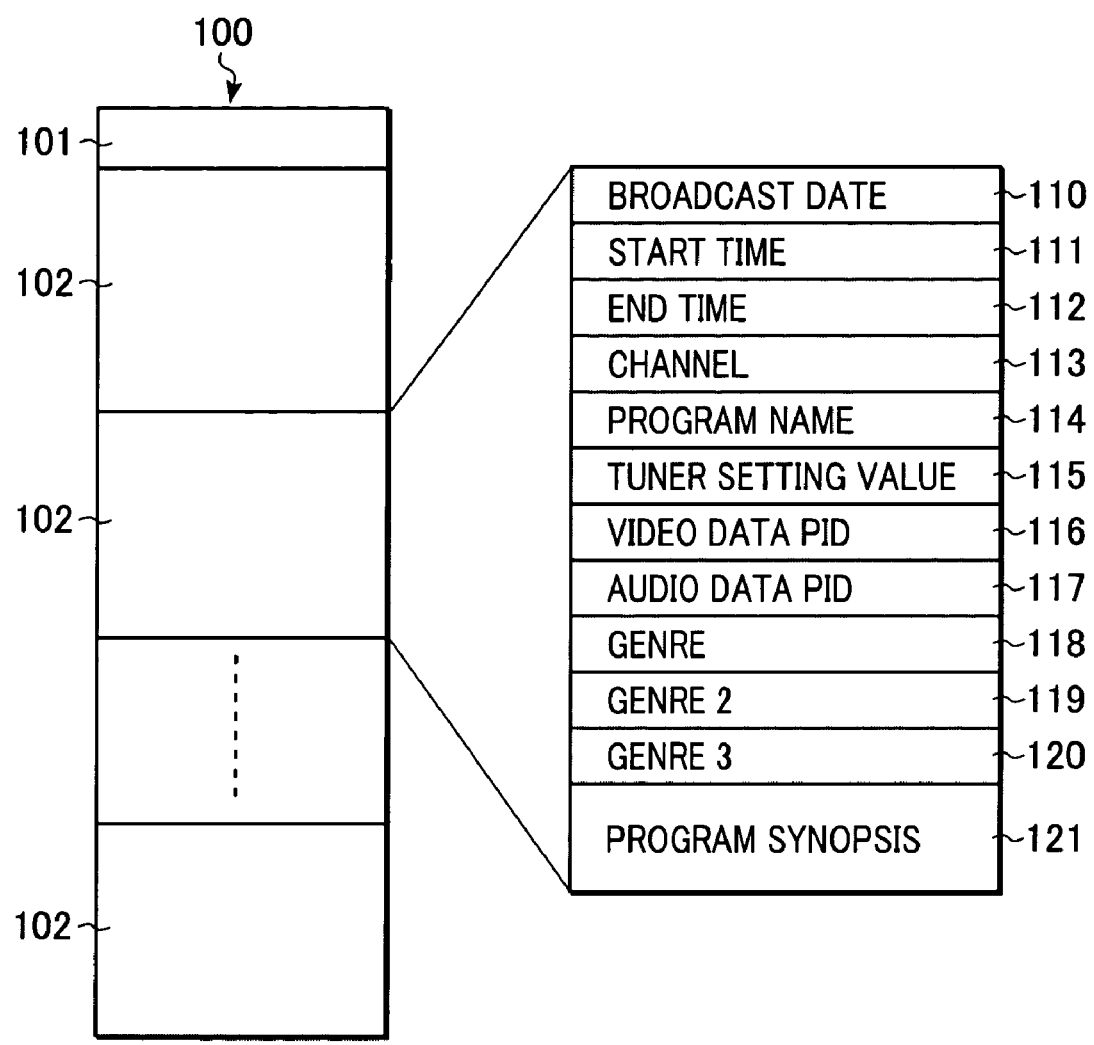
FIG. 3 schematically illustrates the structure of a program information database.

The section decoder 8 analyzes the transport packet containing the supplied program information so as to extract the program information having ID information of the program, such as that shown in FIG. 3, and registers the program information in a program information database. The program information database is edited, as in a table 500 shown in FIG. 6, as an EPG at a designated time and date (at a current time as a default) in response to an instruction from the user by using the remote controller 5, which serves as setting means. The EPG 500 is then visualized by an on screen display (OSD) 15 and is overlapped with the image supplied from the video decoder 9 in an adder 10. The EPG 500 overlapped with the image is then output to an output unit. FIG. 3 illustrates an example of the configuration and content of the program information database.

A hard disk drive (HDD) controller 11, which serves as recording/playback means, manages the storage of programs in a hard disk. A video cassette recorder (VCR) controller 12 manages the storage of programs in a digital VHS. The system controller 7 controls the overall elements of the recording/playback apparatus. A control program of this embodiment is stored in a flash read only memory (ROM) 13, and is loaded to a memory 14 and is executed when power is supplied. The memory 14 is used, not only as a work area for the control program, but also as a work area for temporarily storing a transport stream and for converting transport packets into an ES.

When making reservations for recording programs, the user displays the EPG 500 (see FIG. 6) created from a program database 100, such as that shown in FIG. 3, by using the remote controller 5 or an STB operation panel (not shown), and selects a program to be reserved by using the remote controller 5 or the STB operation panel. When a desired program is selected, program information corresponding to the selected program is extracted from the program database 100, and is registered in a program reservation database 200, such as that shown in FIG. 4. The program information is retained by retaining means, which forms the system controller 7. In the program reservation database 200, a record mode 210 indicates, for example, a standard-play mode or a long-play mode, designated by a reserve operation with the pixel rate.

Figure 4:
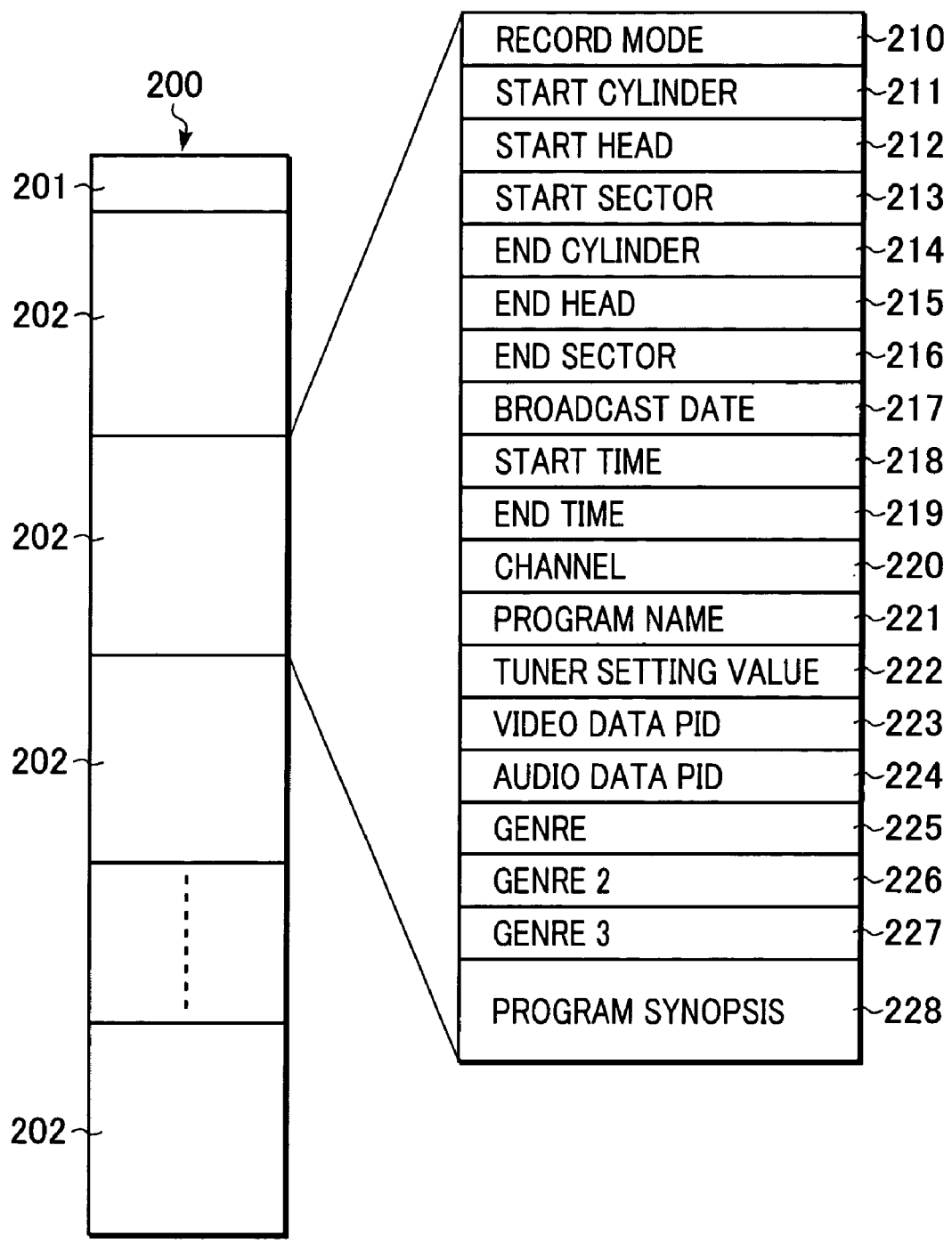
FIG. 4 schematically illustrates the structure of a program reservation database.

In the program reservation database 200 shown in FIG. 4, a start cylinder 211, a start head 212, a start sector 213, an end cylinder 214, an end head 215, and an end sector 216 are information required for storing programs in a hard disk, and, when making a reservation, "−1" is set in these blocks to indicate that programs are not recorded.

The system controller 7 has a built-in real time clock (RTC), and searches for the broadcast date and the start time of a program to be recorded from the program reservation database 200. When the program reservation time has reached, the system controller 7 reports the record duration (from the start time to the end time) and the record mode of the program to the HDD controller 11 so as to allow the HDD controller 11 to reserve a space of the hard disk that can continuously record the program. The system controller 7 then reports a tuner setting value 222 to the tuner 1, and sets the transponder for the program to be recorded. As described above, the demodulator 2 performs QPSK demodulation and error correction for a digital television broadcast signal selected by the tuner 1, and the demultiplexer 3 separates the video and audio transport packets of the channel of a program to be recorded. The descrambled transport packets are written into a hard disk drive via the HDD controller 11. When the program has been recorded, the start cylinder 211, the start head 212, the start sector 213, the end cylinder 214, the end head 215, and the end sector 216 are updated with the values actually written. The writing of the actual values (which are not −1) into the corresponding blocks of information indicates that the program has been recorded.

Figure 2:
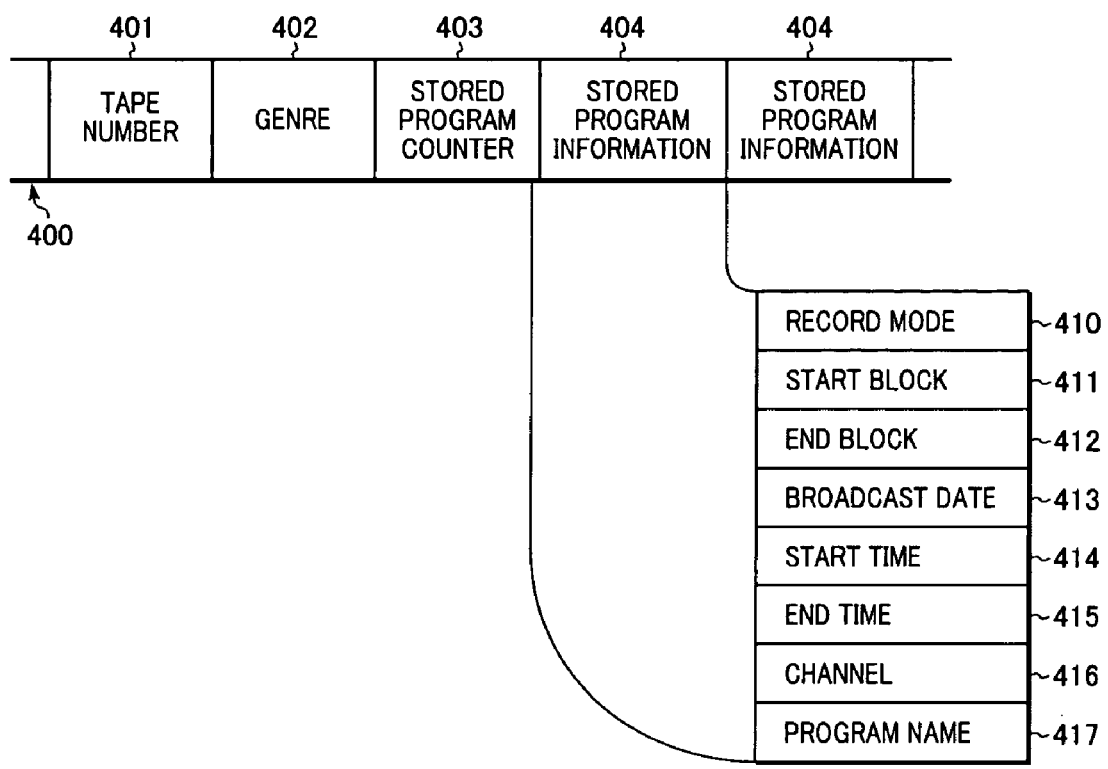
FIG. 2 schematically illustrates a video cassette tape.

The VCR controller 12 has detection means (not shown), and when the detection means detects that a video cassette tape has been loaded, a detection signal is output to the system controller 7. In this case, the VCR controller 12 rewinds the video cassette tape for reading the information written into the head of the video cassette tape. As shown in FIG. 2, a video cassette tape number 401, that is, a unique number for identifying a video cassette tape 400, is indicated in the head block of the video cassette tape 400. However, the video cassette tape number 401 is restricted to the STB used in the recording/playback apparatus, and is not necessarily the unique number on a worldwide basis. The presence of the video cassette tape number 401 indicates that a recorded program is stored in this video cassette tape or that a recorded program is ready to be stored. Accordingly, the VCR controller 12 reads a genre 402, which is the block subsequent to the video cassette tape number 401, and checks which genre of program is to be stored in the video cassette tape 400.

Upon receiving the detection signal, the system controller 7 reads the current status of the reservation information, such as that shown in FIG. 5, from the program reservation database 200 and displays the information by using the OSD 15. In the example shown in FIG. 5, reservation blocks 300, 301, 302, and 303 of a column 310 are indicated by white numbers in a hatched background, indicating that the corresponding programs have been recorded.

The system controller 7 controls the operation for inputting genre information of the loaded video cassette tape read by the VCR controller 12, for selecting programs of the genre information from the recorded programs contained in the program reservation database 200, and for copying the selected programs from the hard disk to the video cassette tape 400. In this case, when the genre 402 is, for example, a movie, the corresponding items of information are the reservations 302 and 303 in the reservation information shown in FIG. 5, and thus, a message for instructing the user to input a user's selection is displayed by using the OSD 15, as shown in FIG. 7.

The user then selects the operation to be performed by using the remote controller 5. If the user selects "YES" by pressing "1", the storage locations of the reservations 202 and 203 in the hard disk are determined from the program reservation database 200, and are reported to the HDD controller 11 so that the video data and the audio data of the stored programs are sequentially read from the hard disk. The read video data and audio data are supplied to the VCR controller 12. A stored-program counter 403 of the video cassette tape 400 retains the number of programs stored. The video cassette tape 400 is forwarded to read the final stored-program information 404. The stored-program information 404 is written in chronological order of the storage time, and thus, the information for the most recently stored program is contained in the final stored-program information 404. Accordingly, for storing a new program in the tape 400, the block subsequent to an end block 412 contained in the final stored-program information 404 is the head block of the unused portion of the video cassette tape 400. The VCR controller 12 forwards the video cassette tape 400 to the head block of the unused portion so as to sequentially write the video data and audio data read from the hard disk into the video cassette tape 400.

Upon completing the writing of the video data and audio data, the VCR controller 12 rewinds the tape 400 so as to increment the stored-program counter 403 by one and skips the stored-program information 404 from that tape position by the number of blocks corresponding to (the size of the stored-program information 404)×(the number of programs equal to that subtracting one from the stored-program counter 403). The VCR controller 12 then sets the information of the stored program in the corresponding items of the stored-program information 404.

Then, a message shown in FIG. 8 is displayed for instructing the user to select whether the stored programs are erased from the hard disk. If the user selects "YES" by pressing "1", the storage locations of the corresponding programs in the hard disk are determined from the program reservation database 200 so as to instruct the HDD controller 11 to release the storage locations. Then, the data of the corresponding programs are erased from the program reservation database 200. If the user selects "NO" by pressing "0", no pressing is performed.

When a new video cassette tape is loaded, that is, when the tape number 401 is not written into the head block of the video cassette tape, a message shown in FIG. 9 is displayed for instructing the user to select for which program genre the user wishes to use this tape. Then, the ID of the selected genre and the tape number are written into the video cassette tape via the VCR controller 12. It should be noted that the tape number starts with 1 and is then sequentially incremented by one, and when it reaches 1000, it is returned to 1.

Second Embodiment

Figure 10:
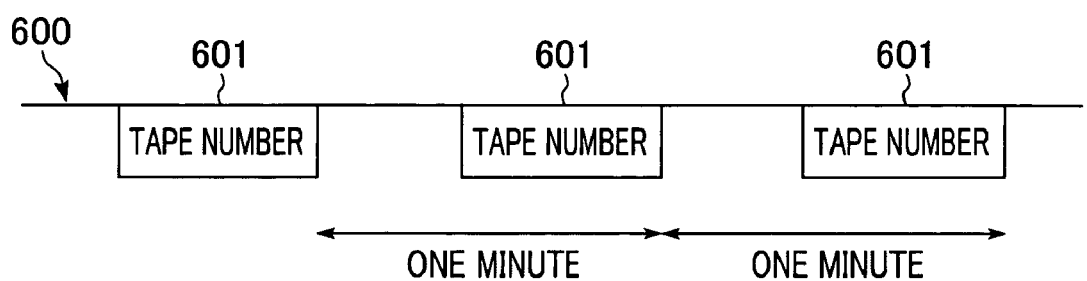
FIG. 10 illustrates the structure of a video cassette tape according to a second embodiment of the present invention.
Figure 11:
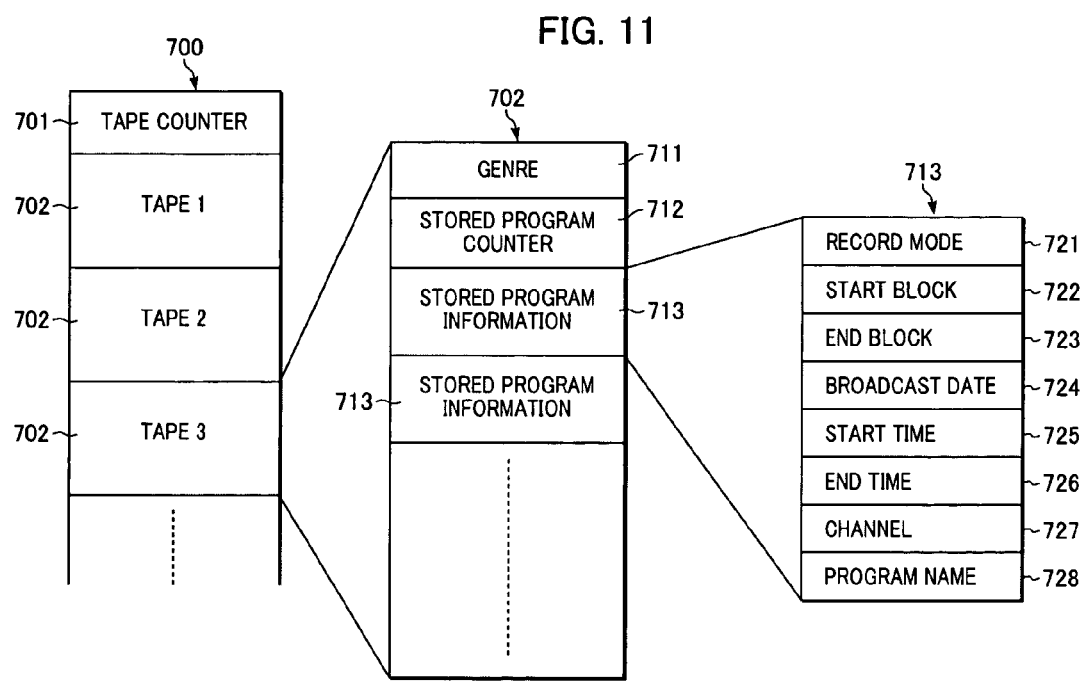
FIG. 11 illustrates an information database of a video cassette tape stored in a flash ROM according to the second embodiment of the present invention.

In the first embodiment, the tape number 401, the genre 402, the stored-program counter 403, and the stored-program information 404 are written into the head of the video cassette tape 400. In this method, however, a video cassette tape has to be rewound every time a program is stored. In a second embodiment, therefore, only the tape number (indicated by reference numeral 601 of FIG. 10) is written in a blank area outside the video/audio recording area at fixed intervals (for example, a tape interval corresponding to one minute) of a video cassette tape. The other items of information are stored in the flash ROM 13 in a data structure shown in FIG. 11. In FIG. 11, reference numeral 700 indicates an information database of a video cassette tape stored in the flash ROM 13. The information database 700 includes a tape counter 701 indicating the number of registered video cassette tapes and a video cassette tape information record 702 for storing information of each video cassette tape, the number of video cassette tape information records 702 being the same as the tape counter 701. The video cassette tape information record 702 includes a genre 711 indicating the type of program to be stored in the video cassette tape, a stored-program counter 712 indicating the number of programs stored, and stored-program information 713. The stored-program information 713 includes a record mode 721, a record start block 722, a record end block 723, a broadcast date 724, a record start time 725, a record end time 726, a channel 727, and a program name 728.

Upon detecting that a video cassette tape has been loaded, the VCR controller 12 forwards and backwards the tape for about one minute, and checks for the tape number 601. When detecting the tape number 601, the VCR controller 12 reads the stored-program information 713 (the same type of information as that written at the head of the video cassette tape 401 in the first embodiment) corresponding to the tape number 601 from the flash ROM 13. The other features of the operation are similar to those of the first embodiment.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording/playback apparatus including a first recording medium and detachably attaching a second recording medium, said apparatus comprising:

an input unit adapted to input program data of a plurality of programs and program information concerning the plurality of programs, wherein the program information comprises program genre information;

a first recording medium recording/playback unit adapted to record on the first recording medium or play back from the first recording medium the program data input by said input unit;

a retaining unit adapted to retain the program information concerning the plurality of programs associated with the corresponding program data recorded on the first recording medium;

a second recording medium recording unit adapted to record the program data on the second recording medium;

a setting unit adapted to set the program genre information selected by a user to the second recording medium before recording; and a control unit comprising (a) a program genre information reading unit for reading from the attached second recording medium the program genre information that was set by said setting unit, (b) a determining unit for automatically determining, in response to said program genre information reading unit reading from the attached second recording medium the program genre information that was set by said setting unit, which program information among the program information retained by said retaining unit has program genre information which matches the program genre information read by said program genre information reading unit, (c) a selecting unit for automatically selecting, from the program data recorded on the first recording medium, program data in the response to determination by said determining unit as to which program information among the program information retained by said retaining unit has program genre information which matches the program genre information read by said program genre information reading unit, and (d) a second recording medium recording controlling unit for controlling said second recording medium recording unit to record on the second recording medium the selected program data, which was recorded on the first recording medium.

2. A recording/playback apparatus according to claim 1, said control unit further comprises an erasing controlling unit for controlling said first recording medium recording/playback unit to erase the selected program data from the first recording medium after said second recording medium recording controlling unit controls said second recording medium recording unit to record, on the second recording medium, the selected program data of the selected program.

3. A recording/playback apparatus according to claim 1, further comprising a record-reservation unit for making a reservation for recording a program,
wherein said retaining unit further retains the program information of the program reserved by said record-reservation unit.

4. A recording/playback apparatus according to claim 1, wherein said second recording medium recording controlling unit controls said second recording medium recording unit in accordance with an instruction input by a user.

5. A recording/playback apparatus according to claim 1, wherein said control unit comprises a detection unit for detecting that the second recording medium has been attached, and wherein said detection unit outputs a detection signal to said control unit, and in response to the detection signal, said program genre information reading unit reads from the attached second recording medium the program genre information that was set in the attached second recording medium by said setting unit.

6. A method for controlling a recording/playback apparatus including a first recording medium and to which apparatus a second recording medium is detachably attachable, said method comprising the steps of:
inputting program data of a plurality of programs and program information concerning the plurality of programs, wherein the program information comprises program genre information;
recording on the first recording medium or playing back from the first recording medium the input program data;
retaining the program information in a retaining unit concerning the plurality of programs associated with the corresponding program data recorded on the first recording medium;
setting program genre information selected by a user to the second recording medium before recording;
reading from the attached second recording medium the program genre information that was set in the attached second recording medium;
automatically determining, in response to said reading of the program genre information, which program information among the program information retained by the retaining unit has program genre information which matches the program genre information read from the attached second recording medium;
automatically selecting, from the program data recorded on the first recording medium, program data in response to said determining; and
recording on the second recording medium the selected program data, which was recorded on the first recording medium.

* * * * *